(12) United States Patent
Kellogg

(10) Patent No.: US 8,763,737 B2
(45) Date of Patent: Jul. 1, 2014

(54) POWERTRAIN COOLING CIRCUIT

(75) Inventor: Brian Keith Kellogg, Bellevue, IA (US)

(73) Assignee: Deere & Company, Moline, IL (US)

( * ) Notice: Subject to any disclaimer, the term of this patent is extended or adjusted under 35 U.S.C. 154(b) by 1240 days.

(21) Appl. No.: 12/544,828

(22) Filed: Aug. 20, 2009

(65) Prior Publication Data

US 2011/0042159 A1    Feb. 24, 2011

(51) Int. Cl.
*B60K 11/00*    (2006.01)

(52) U.S. Cl.
USPC ............... 180/65.6; 180/65.51; 180/339

(58) Field of Classification Search
USPC ......... 180/65.51, 308; 903/906, 952; 301/6.5; 310/52, 54, 57, 60 R, 75 R
See application file for complete search history.

(56) References Cited

U.S. PATENT DOCUMENTS

| | | | | |
|---|---|---|---|---|
| 4,799,564 | A * | 1/1989 | Iijima et al. | 180/65.51 |
| 5,702,161 | A * | 12/1997 | Finney et al. | 299/37.1 |
| 7,296,543 | B2 * | 11/2007 | Namuduri et al. | 123/41.44 |
| 7,527,114 | B2 * | 5/2009 | Wendl et al. | 180/65.51 |
| 7,938,212 | B2 * | 5/2011 | Sakuma et al. | 180/65.51 |
| 8,251,167 | B2 * | 8/2012 | Moriguchi et al. | 180/65.51 |
| 2004/0204276 | A1 * | 10/2004 | Tarasinski | 475/5 |
| 2006/0113136 | A1 * | 6/2006 | Donaldson et al. | 180/242 |
| 2007/0199339 | A1 * | 8/2007 | Ishihara et al. | 62/242 |
| 2007/0203629 | A1 * | 8/2007 | Tarasinski et al. | 701/50 |
| 2010/0140020 | A1 * | 6/2010 | Murahashi | 184/6.12 |
| 2011/0010058 | A1 * | 1/2011 | Saito et al. | 701/50 |
| 2011/0248110 | A1 * | 10/2011 | Graner et al. | 241/101.2 |
| 2012/0266970 | A1 * | 10/2012 | Ramler | 137/15.01 |

* cited by examiner

*Primary Examiner* — John Walters
*Assistant Examiner* — James Triggs
(74) *Attorney, Agent, or Firm* — Faegre Baker Daniels LLP

(57) ABSTRACT

A vehicle, such as a loader, is disclosed. The vehicle includes a cooling system having a pump that communicates coolant to heat-generating components to be cooled by the coolant.

20 Claims, 4 Drawing Sheets

POWERTRAIN COOLING CIRCUIT

FIELD OF THE INVENTION

The present disclosure relates to a vehicle with a cooled powertrain.

BACKGROUND OF THE INVENTION

To avoid overheating, vehicle components are sometimes cooled. When a coolant is used to cool the component, it is sometimes necessary to pump the coolant to or from the component to be cooled.

SUMMARY OF THE INVENTION

According to an aspect of the present invention, a vehicle is provided including a chassis; a plurality of traction devices positioned to support the chassis; an axle coupled to at least one of the plurality of traction devices; a tool supported by the chassis to move material; a drivetrain including a plurality of components including at least one drive configured to power movement of at least one of the plurality of traction devices; and a coolant system including a coolant, a coolant delivery device positioned to direct coolant to at least one of the plurality of components of the drivetrain, and a pump positioned in the axle to pump coolant through at least a portion of the coolant system.

According to another aspect of the present invention, a vehicle is provided including a chassis; a plurality of traction devices positioned to support the chassis; a tool supported by the chassis to move material; a drivetrain including a plurality of components including at least one drive configured to power movement of at least one of the plurality of traction devices; and a coolant system including a coolant, a coolant delivery device positioned to direct coolant to at least one of the plurality of components of the drivetrain, and a pump powered by the drive.

According to another aspect of the present invention a vehicle is provided including a chassis; a plurality of traction devices positioned to support the chassis; a tool supported by the chassis to move material; a drivetrain including a plurality of components including at least one drive configured to power movement of at least one of the plurality of traction devices; a coolant system including a coolant and a coolant delivery device positioned to direct coolant to a heat-generating component of the vehicle, and a driven component that is powered by movement of the coolant.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein.

Figure 1:
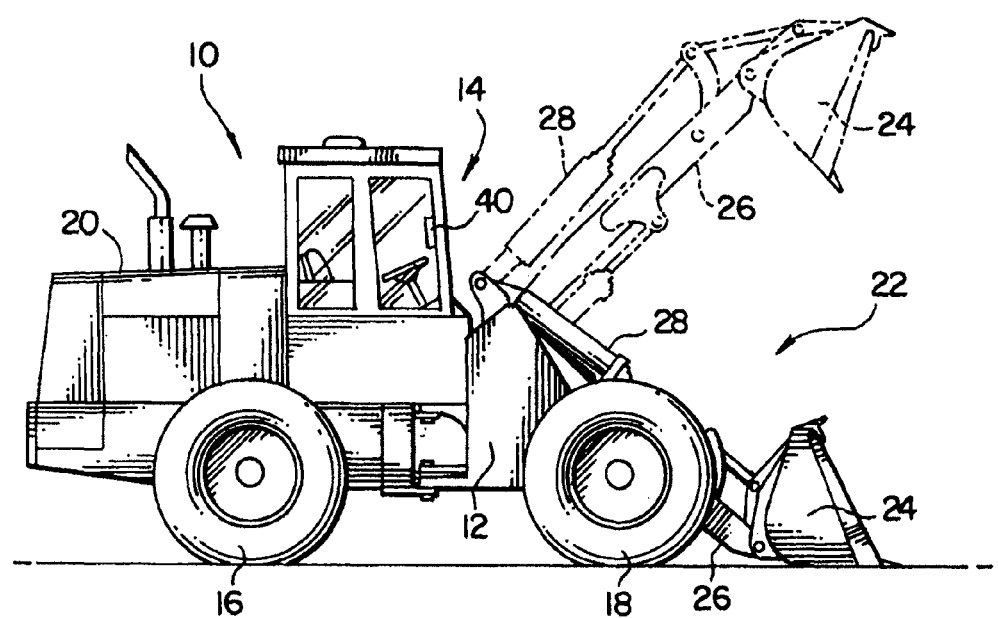
FIG. 1 is a side elevation view of a loader.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Loader 10 is shown in FIG. 1 for scooping and dumping material. Loader 10 includes articulated chassis 12, operator cab 14 supported by chassis 12, pair of rear wheels 16, also described as traction devices, to propel chassis 12 and the remainder of loader 10, pair of front wheels 18, which may also be described as traction devices and may also propel loader 10, engine 20 to power operation of loader 10, and boom assembly 22. Boom assembly 22 includes bucket 24, boom linkages 26, and lift cylinders 28.

Although a loader is described in detail, the features described herein may be provided on other vehicles such as bull dozers, motor graders, and other construction vehicles having various construction tools and traction devices, such as wheels and tracks. The vehicle may also be an agricultural vehicle, such as a tractor, combine, or other agriculture vehicle. Bucket 24 is described as a construction tool that scoops and dumps materials, such as dirt, sand, gravel, salt, snow, and other materials. Other tools, such as blades, pallet forks, bail lifts, augers, plows, trailers, planters, corn heads, cutting platforms, and other tools may also be provided to move materials.

Figure 2:
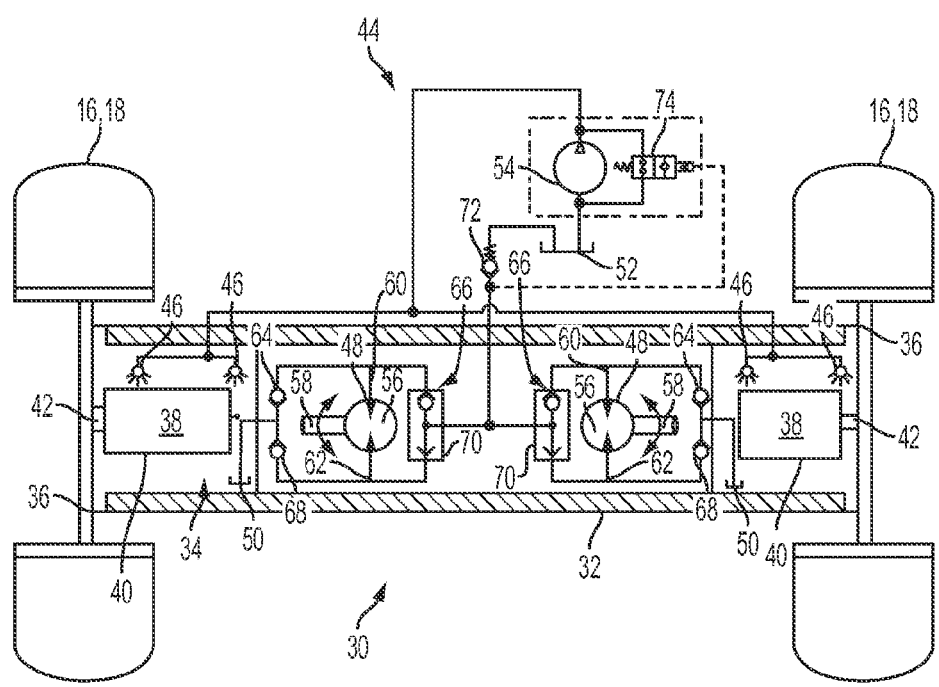
FIG. 2 is a schematic view of components of drivetrain coupled to a set of traction devices, such as wheels, and a coolant system communicating coolant through a vehicle, such as a loader.

As shown in FIG. 2, loader 10 includes axle 30 having an axle tube or housing 32 supported by wheels 16, 18. A drivetrain 34 is positioned in axle tube 32 to power rotational movement of wheels 16, 18. A bearing 36 is positioned between stationary axle tube 32 and wheels 16,18 to facilitate rotation of wheels 16, 18 relative to axle tube 32.

According to the preferred embodiment of the present disclosure, drivetrain 34 includes a pair of electric motors 38 or other electrical machines capable of powering movement of wheels 16, 18. Motors 38 include a stator 40 coupled to axle tube 32 that is stationary and a rotor 42 with an output shaft that rotates relative to axle tube 32 and stator 40 to rotate wheels 16, 18.

During operation, motors 38, other components of drive train 34, and other components may generate waste heat. To avoid overheating or other undesirable side effects of waste heat, a coolant system 44 is provided to cool the components.

Coolant system 44 includes coolant delivery devices 46 that directs coolant toward the component to be cooled, such as motors 38, a plurality of coolant lines, a pair of pumps 48 that pressurize the coolant in the coolant lines, and dry sumps 50 positioned to collect coolant draining off of the cooled components. Coolant delivery device 46 may be a spray head, nozzle, jet, or other device configured to direct or deliver coolant to a component to be cooled.

As shown in FIG. 2, pumps 48 are positioned in axle 30. Pumps 48 draw coolant from dry sumps 50 and the coolant lines deliver pressurized coolant from pumps 48 to a central or master reservoir 52. Coolant system 44 also includes a central pump 54 that draws coolant from reservoir 52 to supply pressurized coolant to coolant delivery devices 46.

Pumps 48 located within axel 30 are powered by operation of motors 38. Portions of pumps 48, such as the pump housing 56, are coupled or grounded to axle tube 32. Whereas drive shafts 58 of pumps 48 are coupled rotate with wheels 16, 18 and/or rotors 42 of motors 38. Drive shafts 58 may be coupled directly to rotors 42 or wheels 16, 18 or indirectly coupled thereto. For example, rotor 42 may extend from each end of stator 40 with one end coupled to a wheel 16, 18 and the other end coupled to drive shaft 58 of pump 48. Drive shafts 58, rotors 42, and axle tubes 32 may be coaxial.

As a result of being coupled to either rotor 42 and/or wheel 16, 18, pumps 48 are powered or driven when rotor 42 rotate. Therefore, motors 38 power pumps 48 by rotation of rotors 42 and motors 38 also power rotation of wheels 16, 18. As a result, pumps 48 preferably only operate during rotation of rotors 42 and/or wheels 16, 18.

Motors 38 and pumps 48 are preferably bi-directional so they operate in either direction of rotation. For example, rotors 42 rotate in one direction to drive loader 10 forward and in an opposite direction to drive loader 10 backwards. Pumps 48 draw coolant from dry sumps 50 whether drive shafts 58 are rotate in a clockwise or counterclockwise direction. Therefore, pumps 48 pump coolant whether loader 10 is being driven forward or backwards.

Pumps 48 draw in and expel coolant in opposite directions when being rotated in the clockwise and counterclockwise directions. To prevent coolant from being pumped to dry sumps 50 and drawn from reservoir 52, coolant system 44 includes a plurality of check valves to control the flow of coolant from dry sumps 50 and to reservoir 52. When operating in one direction, pumps 48 expel coolant from upper ports 60 and draw coolant into lower ports 62. Check valves 64 block coolant from upper ports 60 from being pumped to dry sumps 50 and check valves 66 block coolant from upper ports 60 from being drawn back into lower ports 62. When operating in the opposite direction, pumps 48 expel coolant from lower ports 62 and draw coolant into upper ports 60. Check valves 68 block coolant from lower ports 62 from being pumped to dry sumps 50 and check valves 70 block coolant from lower ports 62 from being drawn back into upper ports 60. Check valve 72 blocks coolant from being drawn from reservoir 52.

Normally, the components of drivetrain 34, such as motors 38, generate most or all of their waste heat during movement of wheels 16, 18. As a result, there is less of a need to provide coolant to the components of drivetrain 34 when loader 10 is not moving. To reduce or eliminate the unnecessary cooling of drivetrain 34, the operation of pump 54, is controlled by operating of drivetrain 34.

As shown in FIG. 2, coolant system 44 includes a control valve 74 that controls the flow of coolant from pump,54 to axle 30. Control valve 74 monitors or is controlled by operation of pumps 48 in axle 30 that are controlled by rotation of wheels 16, 18 and/or rotation of rotors 42. Control valve 74 is a piloted valve that moves between opened (shown in FIG. 2) and closed positions. When in the open position, control valve 74 short circuits the flow path to axle 30. As a result, little or no coolant flows to axle 30. During operation of pumps 48, pressure is provided to control valve 74 that moves it to the closed position (not shown) so it is no longer short circuiting the flow path to axle 30. As a result, pump 54 provides coolant to axle 30 and coolant delivery devices 46.

Because pumps 48 only operate during rotation of wheels 16, 18 and/or rotors 42, they do not drain coolant from axle 30 while loader 10 is stationary. Therefore, by stopping pump 54 from supplying coolant to axle 30 when loader 10 is not operating, as discussed above, coolant does not build up in axle 30 while loader 10 is stationary or wheels 16, 18 and/or rotors 42 are not rotating.

Figure 3:
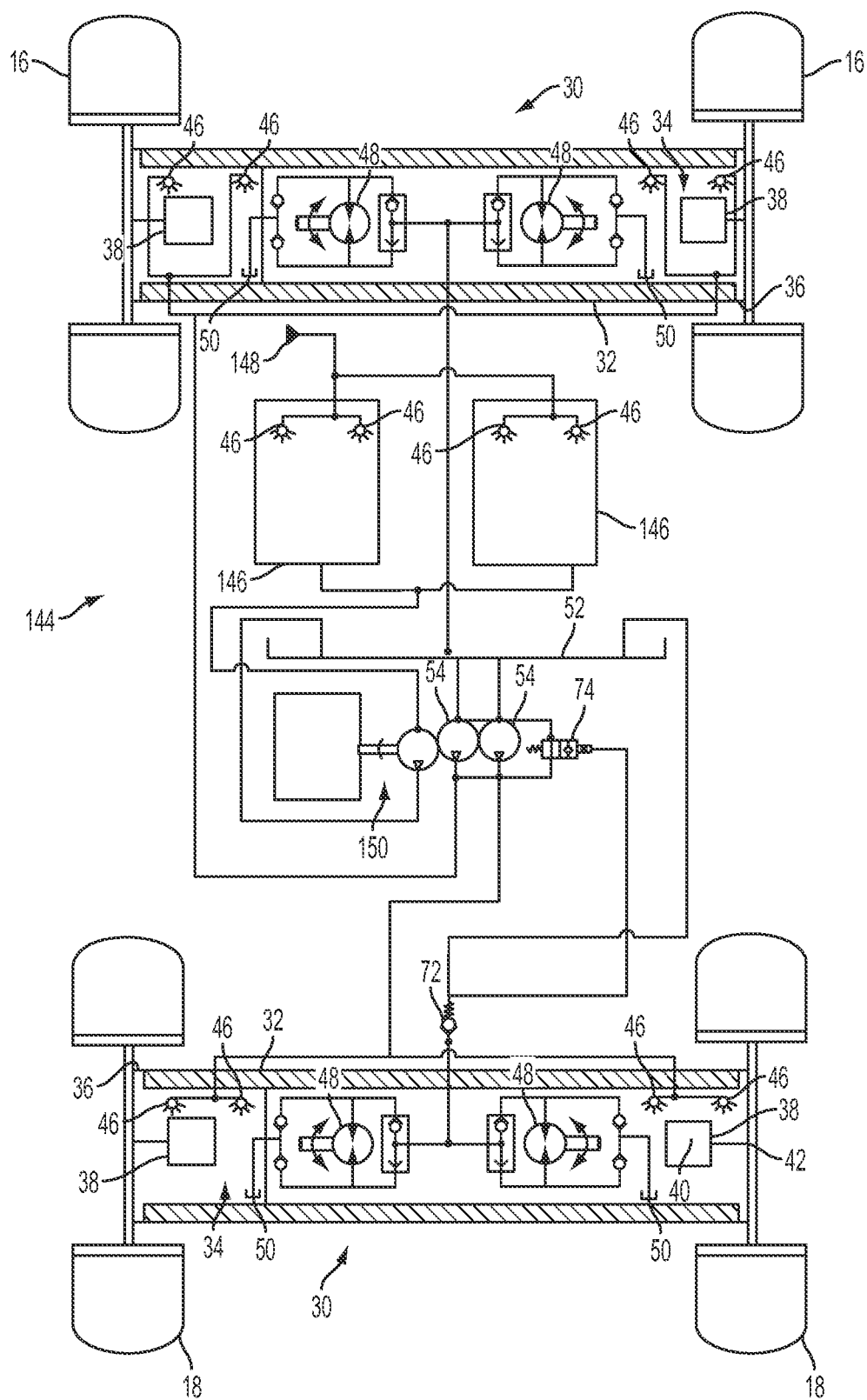
FIG. 3 is a schematic view of components of drivetrain coupled to a two sets of traction devices, such as wheels, and an alternative coolant system communicating coolant through a vehicle.

An alternative embodiment coolant system 144 is shown in FIG. 3. Many of the components of coolant system 144 are the same or similar to coolant system 44 discussed above. Components that are similar in the systems use the same element numbers in the drawings.

As shown in FIG. 3, a vehicle such as that shown in FIG. 1 includes a pair of electric generators or heat generating components 146 and a hydraulic fan 148 or other component that is driven by a fluid. Electrical generators 146 may be driven by engine 20 and provide electricity for vehicle 10. Such electricity may be used to power motors 38, pumps 54, or other electrical devices on or off of vehicle 10. During operation, electric generators 146 generate waste heat.

According to this embodiment, hydraulic fan 148 is driven by the coolant of coolant system 144. After the coolant passes through fan 148, it is directed to coolant delivery devices 46 that deliver coolant to components within electric generators 146. After passing over these components, the coolant is drawn from electric generators 146 by a pump 150 that delivers the coolant to reservoir 52. Coolant to hydraulic fan 148 is provided by a pump (not shown) that draws fluid from reservoir 52.

Figure 4:
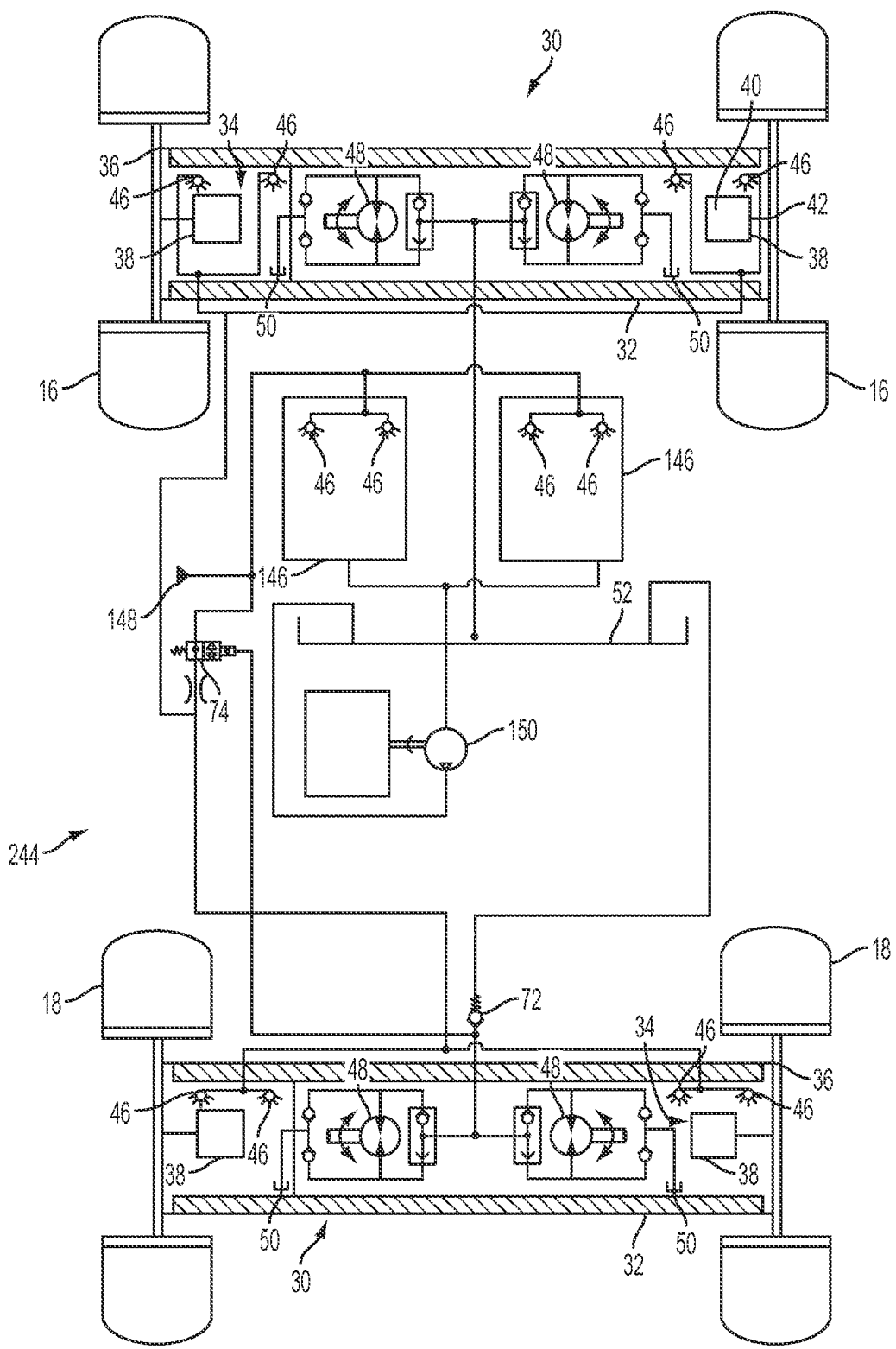
FIG. 4 is a schematic view of components of drivetrain coupled to a two sets of traction devices, such as wheels, and an alternative coolant system communicating coolant through a vehicle.

Another alternative embodiment coolant system 244 is shown in FIG. 4. Many of the components of coolant system 244 are the same or similar to coolant system 44 and coolant system 144 discussed above. Components that are similar in the systems use the same element numbers in the drawings.

As shown in FIG. 4, a vehicle such as that shown in FIG. 1 includes electric generators or heat generating components 146 and hydraulic fan 148 or other component that is driven by a fluid.

After the coolant passes through fan 148, it may be directed only to coolant delivery devices 46 that deliver coolant to components within electric generators 146 or also to coolant delivery devices 46 in axles 30 coupled to wheels 16, 18. Coolant system 244 includes control valve 74 that controls the flow of coolant from fan 148 to axles 30. Control valve 74 monitors or is controlled by operation of pumps 48 in the lower axle 30 shown in FIG. 4 that are controlled by rotation of wheels 18 and/or rotation of rotors 42 in the lower axle 30. Control valve 74 is a piloted valve that moves between opened and closed positions (shown in FIG. 4). During operation of pumps 48, pressure is provided to control valve 74 that moves it to the opened position. As a result, fan 148 provides coolant to axles 30 and coolant delivery devices 46 therein. When in the closed position, control valve 74 blocks the flow of fluid to axles 30.

Because pumps 48 only operate during rotation of wheels 16, 18 and/or rotors 42, they do not drain coolant from axle 30 while loader 10 is stationary. Therefore, by stopping fan 148 from supplying coolant to axles 30 when loader 10 is not moving, as discussed above, coolant does not build up in axles 30 while loader 10 is stationary or wheels 16, 18 and/or rotors 42 are not rotating.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including
   a chassis;
   a plurality of traction devices positioned to support the chassis;
   an axle coupled to at least one of the plurality of traction devices;
   a tool supported by the chassis to move material;
   a drivetrain including a plurality of components including at least one drive configured to power movement of at least one of the plurality of traction devices; and
   a coolant system including a coolant, a coolant delivery device positioned to direct coolant to at least one of the plurality of components of the drivetrain, a reservoir, a first pump that draws coolant from the reservoir for delivery to the coolant delivery device, and a second pump positioned in the axle to pump coolant through at least a portion of the coolant system, at least one of the first pump and the reservoir being positioned outside the axle.

2. The vehicle of claim 1, wherein the coolant system includes a dry sump positioned in the axle to receive coolant directed at the at least one component of the drivetrain by the coolant delivery device and the second pump draws coolant from the dry sump.

3. The vehicle of claim 2, wherein the second pump draws coolant from the dry sump for delivery to the reservoir, and the first pump pressurizes coolant for delivery to the coolant delivery device.

4. The vehicle of claim 3, wherein operation of one of the first and second pumps controls operation of the other of the first and second pumps.

5. The vehicle of claim 1, wherein the drive is an electric motor having a stator supported by the axle and rotor coupled to at least one of the plurality of traction devices to rotate said traction device and propel the vehicle.

6. The vehicle of claim 1, wherein operation of at least one of the first and second pumps is controlled by rotation of at least one of the plurality of traction devices.

7. The vehicle of claim 1, wherein the drive powers the second pump.

8. A vehicle including
   a chassis;
   a plurality of traction devices positioned to support the chassis;
   an axle coupled to at least one of the plurality of traction devices;
   a tool supported by the chassis to move material;
   a drivetrain including a plurality of components including at least one drive configured to power movement of at least one of the plurality of traction devices; and
   a coolant system including a coolant, a coolant delivery device positioned in the axle to direct coolant to at least one of the plurality of components of the drivetrain, a reservoir, a first pump configured to pump coolant to the coolant delivery device, and a second pump powered by the drive and configured to pump coolant to the reservoir, at least a portion of the coolant system being positioned outside the axle.

9. The vehicle of claim 8, wherein the coolant system includes a dry sump positioned in the axle to receive coolant directed to at least one component of the drivetrain.

10. The vehicle of claim 8, wherein the second pump is a bi-directional pump.

11. The vehicle of claim 8, wherein the second pump includes a drive shaft that is substantially co-axial with an axis of rotation of at least one of the plurality of traction devices.

12. The vehicle of claim 8, wherein the second pump includes a drive shaft and the drive includes an output shaft that is substantially co-axial with the drive shaft of the pump.

13. The vehicle of claim 8, wherein the first pump is controlled by operation of the drive.

14. A vehicle including
   a chassis;
   a plurality of traction devices positioned to support the chassis;
   a tool supported by the chassis to move material;
   a drivetrain including a plurality of components including at least one drive configured to power movement of at least one of the plurality of traction devices;
   a coolant system including a coolant and a coolant delivery device positioned to direct coolant to a heat-generating component of the vehicle, and
   a driven component that is powered by movement of the coolant.

15. The vehicle of claim 14, wherein the driven component is a hydraulic fan.

16. The vehicle of claim 14, wherein the driven component is upstream in the coolant system of the heat-generating component.

17. The vehicle of claim 14, wherein the flow of coolant is controlled by rotation of at least one of the plurality of traction devices.

18. The vehicle of claim 14, further comprising an axle supported by at least one of the plurality of traction devices, wherein coolant from the driven component is directed into the axle to cool at least one of the plurality of components of the drivetrain positioned in the axle.

19. The vehicle of claim 18, wherein the flow of coolant into the axle is controlled by operation of at least one of the plurality of traction devices.

20. The vehicle of claim 8, wherein at least one of the first pump and the reservoir are positioned outside the axle.

* * * * *